UNITED STATES PATENT OFFICE.

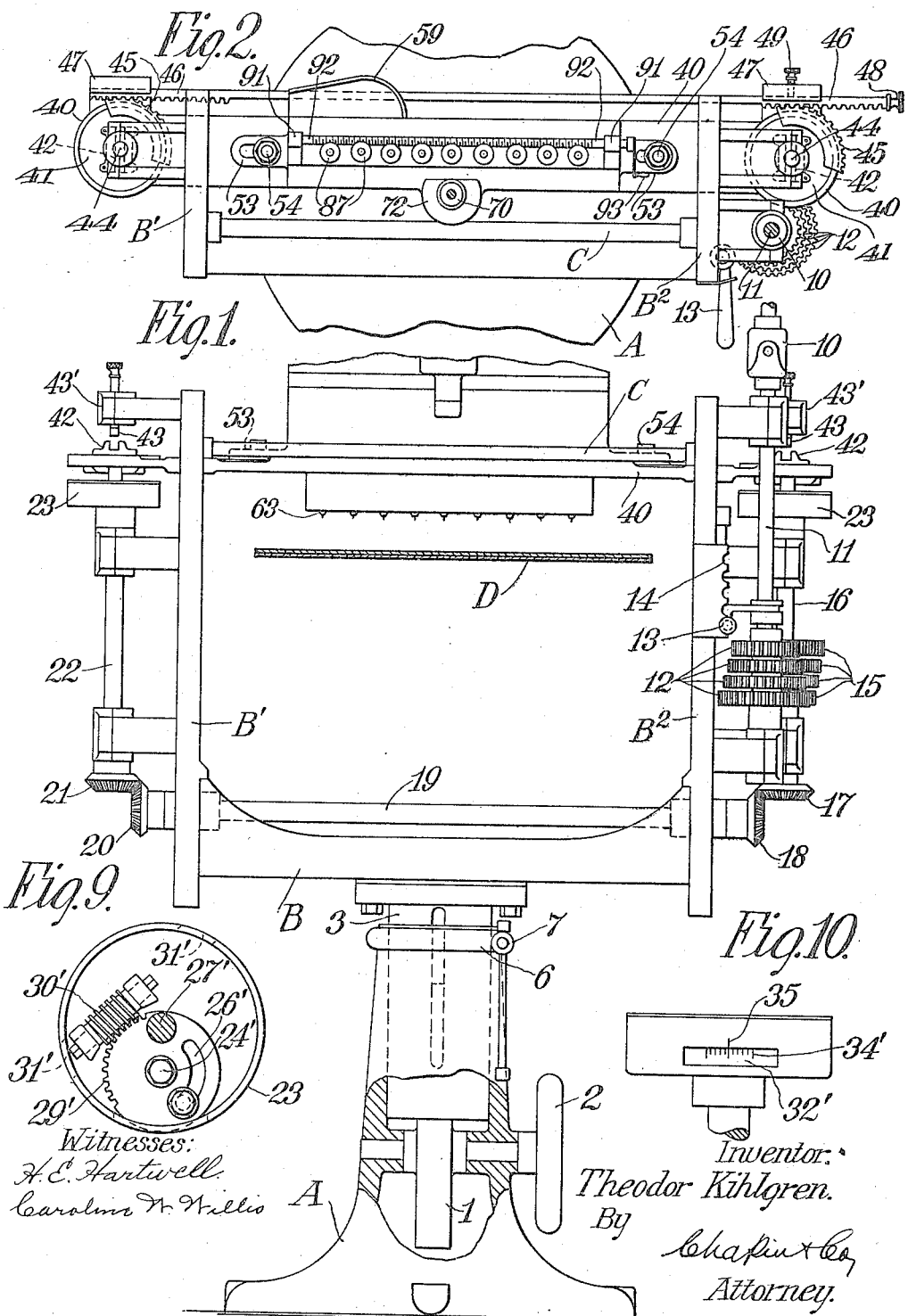

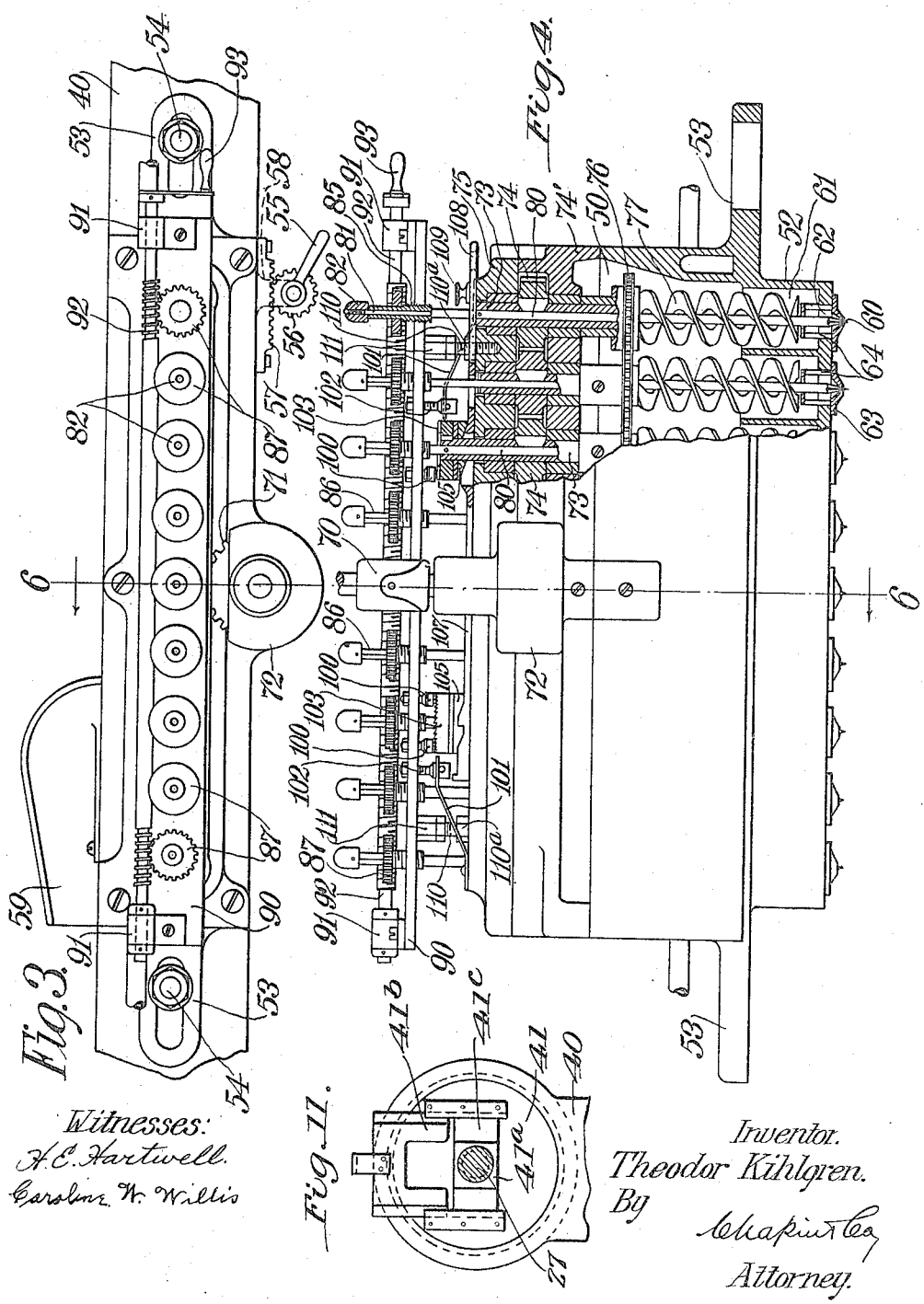

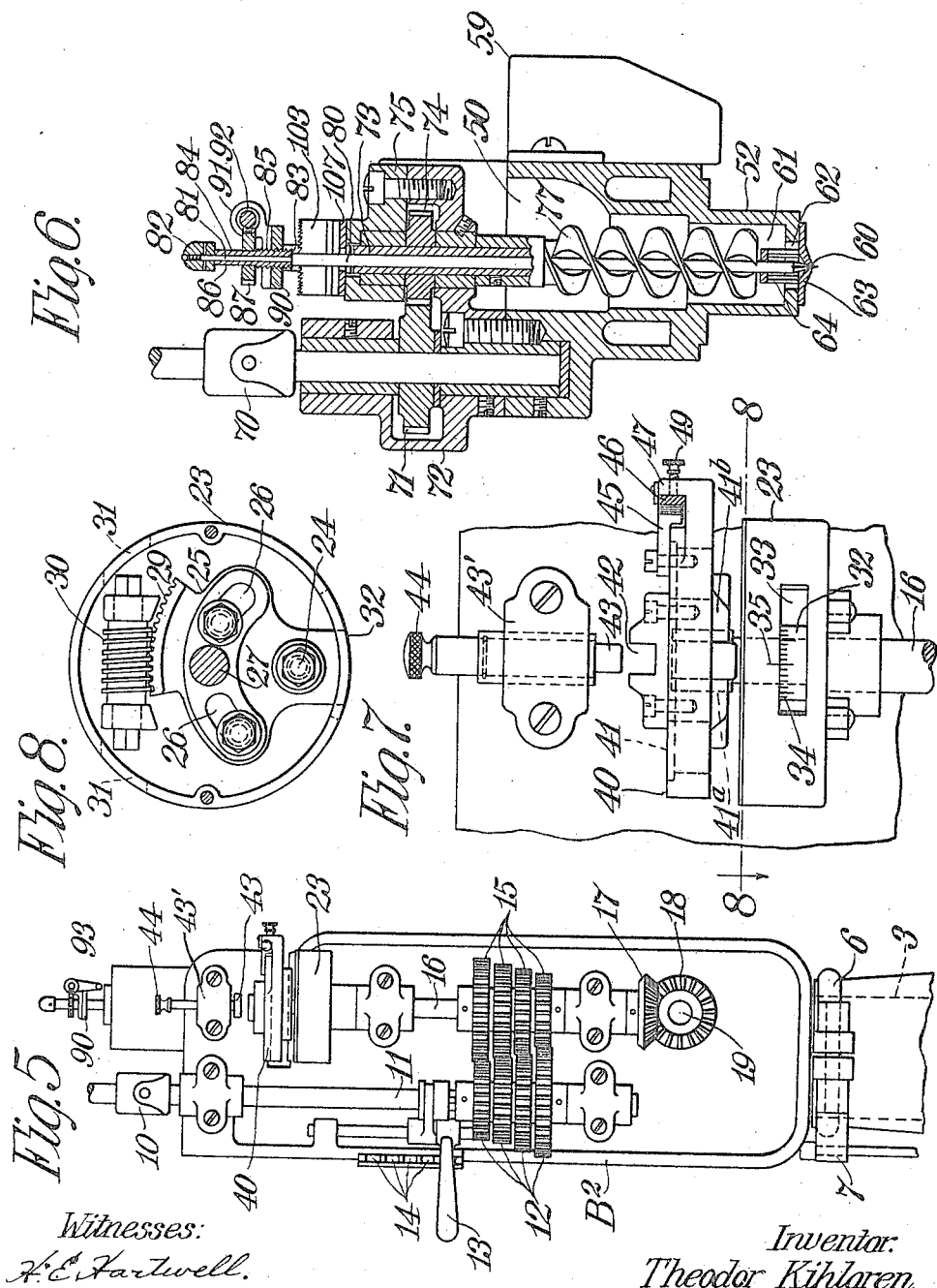

THEODOR KIHLGREN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

CHOCOLATE-STRINGING MACHINE.

1,208,328. Specification of Letters Patent. Patented Dec. 12, 1916.

Application filed October 13, 1913. Serial No. 794,872.

*To all whom it may concern:*

Be it known that I, THEODOR KIHLGREN, a citizen of the United States, residing in Springfield, in the county of Hampden, in the State of Massachusetts, have invented certain new and useful Improvements in Chocolate-Stringing Machines, of which the following is a specification.

This invention relates to a stringer or machine for applying a string of a fluid such as chocolate to the surface of confectionery or other articles in a decorative fashion.

The machine upon which this application is based, is in its general function and arrangement broadly similar to the one disclosed in my co-pending application, Serial No. 454,422, filed September 23, 1908, but involves as its features of invention many changes, modifications, additions, and improvements, each of which is designed to give both by itself and in combination with the other, a more rapid, less expensive, and more efficient operation of the machine as a whole.

One object of the invention is to provide a means whereby a ready adjustment may be made of the various ejecting spindles used therein, either independently or collectively.

Another object of the invention is to provide a special and peculiar ejecting arrangement for the chocolate, so designed as to allow a free flow of the chocolate thereabout and therethrough.

A still further object of the invention is to provide an improved means of controlling the several motions of the vat from which the strings of chocolate issue.

Another object of the machine is to provide a means for varying the size of the strings laid and the configuration thereof, either or both as the case may be, by one simple adjustment.

Other objects of the invention include provision of various new relative adjustments of the parts, and the adjustment of all the parts to a greater nicety than possible in my other machine.

Numerous other advantages, objects, and features of this invention will appear as the description to follow proceeds.

In the drawings: Figure 1 is an elevation of my machine with parts broken out. Fig. 2 is a top plan view thereof. Fig. 3 is a top plan view of a portion thereof upon an enlarged scale. Fig. 4 is a front elevation of what is shown in Fig. 3 with parts in cross section. Fig. 5 is an end view of a portion of the device. Fig. 6 is a sectional view on line 6—6 of Figs. 3 and 4. Fig. 7 is a detail view of the motion controlling mechanisms, and Fig. 8 is a plan view of one element thereof. Figs. 9 and 10 are a plan and an elevation respectively of a modification. Fig. 11 is a bottom plan view of a portion of the reciprocating bar showing clearly the controlling mechanism, whereby either circular or rectilinear movements of the bar may be obtained.

Referring to the drawings: The machine as a whole is supported upon the stand A, in which is mounted the cam 1, operable by the hand wheel 2, the stand A being recessed for the accommodation of the leg 3 which supports the machine, furthermore being split as shown more clearly in Fig. 5, to receive the clamp 6, operated by the bolt 7. By this means it will be seen that the vertical height of the machine may be adjusted from the hand wheel 2 by means of the cam 1, and once adjusted the parts may be held in place by the clamp 6. This adjustment has a novel and highly advantageous result as will hereafter appear. The framework of the machine proper comprises a substantially U-shaped frame B including the upright side plates B' and B² which may be secured if desired at the top by the tie-rod C. The moving stringer nests in the top of the U-shaped frame B', B² and the articles to be decorated or to which the chocolate is to be applied are carried through this frame upon the conveyer D, shown in cross section in Fig. 1, by mechanism specifically forming no part of this invention.

I will now describe the driving connections for the moving stringer. These connections are driven from any convenient source of power through the intermediary of the universal joint 10 which drives the shaft 11, which shaft carries upon its lower end a change speed device comprising a set of gears 12, any one of which may be pinned to the shaft 11 by means of a key-selector set to propel any one gear by means of the handle 13 and the notched plate 14 in an obvious manner. The top notch in plate 14 corresponds to a position in which none of the gears 12 is driven. Coöperating with the gears 12 is the corresponding set of gears 15 pinned to the shaft 16. It must be obvious that the shaft 16 may be driven at any speed within the range of the change speed device or not driven at all, simply by seating the handle 13 in one or the other of the notches in the plate 14. The shaft 16 carries at its lower end a bevel gear 17 which through a bevel gear 18, drives the shaft 19, which in turn, by the bevel gears 20, 21, drives the shaft 22. The shafts 16 and 22 each carry a mechanism for giving a variable motion to the stringer. These mechanisms are similar as can be seen in Fig. 1, and therefore, only one of the two will be specifically described. The shaft 16 at its upper end is seated in and secured to the cup 23, upon the bottom of this cup there being pivoted at 24, a variable crank movement, comprising the plate 25, having therein segmental guiding slots 26, the crank pin 27 and the segmental gear 29 with which coöperates the worm 30, carried in bearings rigid with the cup and accessible through apertures 31, as clearly shown in Fig. 8. The end 32 of the member 25 is carried through an aperture 33 in the cup 23, and carries thereon a scale 34, readable with a scale mark 35 upon the cup. It will now be clearly seen that by operating the worm 30, the pin 27 may be thrown off center with respect to the cup 23 and therefore, to the shaft 16, to any extent desired within the limits of the adjustments shown. In Figs. 9 and 10 I have shown a modification of this part of my invention in which I make use of a circular plate 29′ in place of the plate 29 shown in Fig. 8, plate 29′ being revolubly mounted at its center in cup 23 at 24′— the other parts of this modification corresponding respectively to those just described and bearing, in the drawings the same reference numerals but primed to denote a specifically different form. The modification is easier to make and cheaper and therefore may be preferable to that shown in Figs. 7 and 8. Thus by the arrangement I have just described, I have provided a crank pin of adjustable throw, and moreover, indicating devices whereby the exact extent of that throw may be readily determined. Located immediately above the cup 23 is one end of the reciprocatory bar 40, this bar having seated therein, the disk 41, as clearly shown in Fig. 11. This disk has a central slot 41ᶜ in which is mounted the slidable block 41ᵃ, having a socket to receive the pin 27 while transversely of the slot is arranged the fork 41ᵇ, dove-tailed into the disk as shown in Fig. 11; thus when the fork is withdrawn the block 41ᵃ is free to slide back and forth in the disk but when the fork 41ᵇ secures the block 41ᵃ it can no longer slide. Upon its upper surface, disk 41 carries the key-way 42 with which coöperates the pin 43, slidable in the bracket 43′, which may be dropped into the slot 42 or removed therefrom by means of the finger piece 44, any suitable provision being made to hold the pin 43 out of operative position whenever desired. The disk 41 has screwed thereto a gear 45 in mesh with the rack bar 46 carried in the wings 47 of the opposite ends of the reciprocating bar 40 adjustable longitudinally by the finger piece 48 and which may be secured in any adjusted position by the set screw 49. It is by these mechanisms just described that I give to the member 40 the movements necessary to produce any decorative effect in the strings laid by my machine on the articles my invention treats. It will be seen that I give to both ends of the bar 40, either a circular movement— both the amplitude and the speed of which movement I may control within wide movements—or a rectilinear movement. When I desire to give the bar a circular movement at both its ends, pin 43 is withdrawn and fork 41ᵇ is moved in to clamp block 41ᵃ. This makes the disk 41 rigid throughout and it takes whatever movement pin 27 takes. Should I desire, however, to give a rectilinear movement, fork 41ᵇ is withdrawn allowing block 41ᵃ to slide freely in disk 41, then key-way 42 is adjusted to the proper inclination and pin 43 dropped therein. This means that crank pin 27 will merely give whatever movement is permitted by the key-way 42, block 41ᵃ sliding back and forth in disk 41 (see Figs. 7 and 8). This construction is substantially similar to that of my other machine. It will be readily understood that these movement controlling devices are similar at each end of the machine. The bar 40 is supported on similar disks 41 at each end. The rack bar 46 controls the inclination of the key-ways 42 in precisely the same fashion at both sides of the machine, while the throw of the pin 27 may be controlled at both sides of the machine by the indicating devices 34—35 to correspond each with the other.

Having fully and clearly described the motion communicating devices whereby I transmit either a rectilinear or a circular motion to my stringer mechanism, I will now turn to the stringer mechanism itself. The stringer mechanism as a whole is located upon the bar 40 which is cut out in the center to accommodate the lower part of this mechanism, which is shown removed from the bar 40 in Fig. 4. The stringer mechanism comprises a tank 50 for the hot chocolate which is kept to the desired temperature by the steam or hot water jacket shown. The stringer device is seated upon the bar 40, its lower portion 52 projecting therethrough and it carries at either end the slotted ears 53 which in connection with the bolts 54 make it possible to adjust the stringer longitudinally with respect to the bar 40, by means of the handle 55 and operating pinion 56 meshing with rack 57, pinion 56 having bearings in the lug 58 rigid with the bar 40, and rack 57 being secured to the casing of the stringer member, (see Fig. 3).

As in my other construction, the stringer member comprises in general, a tank 50, provided with appropriate steam or hot water jackets and an overflow 59. In this tank are mounted a series of reciprocating spindles or plungers, which by an up and down movement operate to positively eject the chocolate from a series of corresponding apertures in the bottom of the stringer, devices being provided both to stir and thoroughly mingle the chocolate and to direct it down toward the opening.

I will now specifically describe the mechanism associated with the stringer. The lower portion of the tank 50 forms a series of wells 61, each one of which is concentric with the aperture 62 over which is fastened a plate 63, having a conical depression therein which leads to the aperture 60. Removably seated in the aperture is a spider 64 which rests upon the plate 63 and has at its upper end, centrally thereof, a bearing alined with orifice 60 for the reception of a vibrating spindle to be hereinafter described. (See Figs. 4 and 6). I wish at this point to particularly point out that the spider 64 and plate 63 are made in two pieces and that the plate 63 is screwed to the bottom of the stringer, whereby, merely by taking off the plate 63, the spider 64 will drop through the opening, and that thus these parts may be readily taken out and thoroughly cleaned.

The stringer mechanism is driven from overhead connections by the universal joint 70 which drives the main gear 71, preferably located in the housing 72, forming a portion of the stringer box. It is obvious that the universal joint 70 could be driven from connections from the main drive shaft 11 by bevel gearing if desired. The gear 71 drives one gear of a series of gears associated with the spindle sleeves and meshing one with another, thereby communicating motion to the whole series. This structure is clearly seen in Fig. 4, wherein it appears that a sleeve 73 is loosely mounted, upon each of the spindles and keyed to that sleeve is a pinion 74, the pinions 74 meshing all the way across the stringer and therefore, all being driven in unison from the master-gear 71. The sleeves 73 have their bearings in the intermediate plate 74' of the stringer box and in the top plate 75 thereof. The two end sleeves 73, one at each end of the machine, carry sprockets, over which two sprockets is trained chain 76. This chain in the operation of the machine assists to keep the chocolate thoroughly stirred. Connected with the sleeve 73 upon each of the spindles is a positive ejecting device 77, comprising a double skeleton screw. I have found that by using a double screw and moreover a skeleton screw, of the type shown, the results in operation are better and that the device is more easily cleaned. The use of a skeleton screw is also highly advantageous for the reason that the chocolate may freely flow in and around and about the spindle and screw and into and out from the space therebetween in any direction. If the screw is sleeved upon the spindle, the chocolate is apt to work up the space between the two and "mess up" the upper part of the ejecting unit. I consider this construction of the ejecting screw an important feature of the invention and broadly new. The screw 77, as may be clearly seen in Figs. 4 and 6, surrounds the spindle proper 80. The spindle 80 at its lower end is held in spider 64 with its end in the recess 60 and it is by positively vibrating this spindle up and down that the chocolate is expelled in a continuous stream through the opening 60.

I will now particularly point out the specific mechanism for operating and controlling the spindle 80. In Fig. 6: The spindle 80 is cylindrical throughout substantially its entire length but is turned down toward the top as shown at 81, and to the top thereof is pinned the finger piece 82. Upon the turned down portion of the spindle between the finger piece 82 and the shoulder 83, is located a sleeve 84, having screw threads 85 upon its lower portion, and being squared at 86 above the screw threads. Slidably mounted upon the squared portion 86 of the sleeve 84 is a gear 87. It is obvious that the gear might be keyed to sleeve 84 or attached thereto by any other equivalent slidable but non-rotatable means. It is understood that each spindle in the stringer is made in the same way, and that each thereof has a gear 87. The spindles are each supported in the plate 90 which has threaded apertures to receive the screw threads 85 upon the collar 84 as just described. The plate 90 has thereon, at either end, an upstanding bracket 91 which carries a worm shaft 92, operable by the handle 93 and meshing with each of the gears 87. I wish here to particularly point out the advantage of this construction. It will be obvious, that by turning the handle 93 and through the intermediary of the worm 92 each of the gears 87 will be turned and that since the shanks 86 upon which these gears are mounted are squared, the screw threads 85 will be rotated in the threaded apertures in plate 90 (supported in a manner to be described) in which they are engaged, and thus the spindles 80 will be raised or lowered as the case may be, to control the relation of their lower ends with the aperture 60. Now by the construction which I have adopted it is clear that not only may I vertically adjust all the spindles in the stringer but I may further adjust any one of them independently of all the others. To do this it is merely necessary to raise the slidable gear 87 upon the squared shank 86 until the gear is free from the worm 92, after which the gear may be turned by hand in either direction to the desired amount and then dropped back into mesh with the worm 92.

I will now describe the mechanism for communicating the variable vibrations to the spindles 80. The plate 90 from which these spindles are all supported carries a set of rigid pawls 100, bolted to its under surface, (see Fig. 4,) and is resiliently held downward by the springs 101, fastened to the top plate 75 of the stringer and then hooked over the adjustable pins 102, depending from the plate 90. The pawls 100 in operation rest upon the serrated edges of the face ratchets 103 which are keyed to, but slidable on the extended sleeves 73, of a pair of the spindles, as clearly shown in Fig. 4. These face ratchets 103, rest in turn upon the cam disks 105, having thereon inclines for coöperation with corresponding inclines upon the slidable rod 107, which is slotted to surround the expanded sleeves 73 in a manner clearly shown in Fig. 4. The rod 107 has a handle 108 at one end thereof, and an adjusting screw 109 by which it may be set in any adjusted position. Adjustably seated in the top plate 75 of the stringer, with the aid of the checking nuts 110ª are bolts 110 and depending from plate 90 are blocks 111 in the position directly above the heads of these bolts. By this construction it is clear that plate 90 will always move away from plate 75 but can never approach it to a less distance than that determined by bolts 110 and stops 111. Now, therefore, these associated parts may be adjusted so as to give a hard or soft vibration to the plate 90 or no vibration whatever to the plate. This is done by means of the single slide bar 107, above described. If this bar is pushed home to the left in the position illustrated in Fig. 4, plate 90 will be lowered until the stops 111 come to rest upon the heads of the bolts 110 and the ratchets 103 will be still further lowered until they clear the rigid pawls 100. If the bar 107 be pulled to the right until cam devices 105 are raised to the full extent of the throw of the coöperating cam faces, the revolution of these ratchets will communicate a violent vibration to the plate 90. If the bar 107 is moved to an intermediate position and secured therein by the thumb screw 109, it will be clear that the ratchets will operate not to give their full throw to the pawls 100 but simply to rapidly lift plate 90 and drop it back to bolts 110, giving as soft a vibration as may be deemed desirable. It is obvious that members 111 may be made as sockets into which the upper ends of bolts 110 penetrate and an adjustable nut might be placed upon the bolt in place of the solid head I have shown. The construction I here illustrate, however, is simpler and cheaper and has been found quite satisfactory for the reason that the spindles operate as a perfect guide for plate 90 and a simple contact device is sufficient for the work the bolts 110 have to do.

I will now describe as briefly as may be the general operation of this machine. In the operation of the machine the movement giving devices for the stringer proper may be set to give a decorative effect upon the goods either involving curves, spirals, cusps, nodes, etc., or a decorative effect involving zig-zags or combinations of straight lines. The first result may be obtained by securing block 41ª by means of fork 41ᵇ, in which event the pin 43 is removed from key-way 42. Inasmuch as the crank pin 27 may be given a throw of any desired amplitude and as, moreover, its speed of revolution may be controlled within very wide limits by the change gear devices shown in Fig. 5, it will be obvious that the combination of the resulting circular movement given to the bar 40 at both ends with the rectilinear movement of belt D whose speed may also be controlled, is competent to produce upon the goods any configuration involving curves, nodes, cusps etc. If, however, it is desired to produce straight line effects upon the goods, fork 41ᵇ is moved to release block 41ª and pin 43 is dropped into key-way 42. This will result in the reciprocation of both ends of bar 40 to any amplitude desired in any direction desired and at any speed desired. When this movement is compounded in the variable speed movement of the conveyer D it will be clear that figures made of straight lines may be produced upon the goods. If a straight string is desired it may be obtained either by setting pin 27 at center or more easily by putting handle 13 into the top notch in plate 14, in which position shaft 16 will not be driven at all and bar 40, therefore, will remain stationary. While the machine is in operation the whole stringer may be shifted longitudinally with respect to its carrier bar 40 to properly aline the strings with the goods by means of handle 55 (see Fig. 3.) While the machine is operating the ejecting screws 77 are continually revolving to force the chocolate toward the openings 60, while chains 76 are assisting to keep the mixture well stirred. At the same time spindles 80 are continually vibrating in a fashion to discharge from orifices 60 a series of fine jets, so rapidly as to produce a continual and uniform fine string of chocolate. The size of this string may be adjusted for any orifice or for all the orifices together by vertically adjusting the spindles in the plate 90, in a manner hitherto described. The vibration given to the plate may be either hard or soft according as to whether ratchets 103 are moved to their uppermost position or to a position lower than their uppermost position, which again as one of its results may vary both the speed of discharge of the chocolate strings and the size of the strings. If desired the vibration of plate 90 may be stopped at any time by lowering ratchets 103 until plate 90 comes to rest upon bolts 110 and is not affected by the rotation of the ratchets. In this position any or all of the spindles may come to a seat in and close orifices 60 according as to whether they are individually adjusted low enough in plate 90. This is a useful result but it is not contemplated that the occasion for it will frequently arise in the operation of the machine. Now if during the operation of the machine the operator should desire to vary either the decorative effect of the particular type of configuration put by the machine upon the goods or the size of the string laid by the stringer, he can do one or both these things as the case may be, by a still further simple act without affecting either the adjustment of the spindles or the adjustment of the compound movement giving devices. This result may be obtained by adjusting the whole machine vertically by means of cam 1 and cam wheel 2. It will be obvious that when the spindle is located at some distance above the conveyer d the strings laid upon the goods will be much finer than if the stringer were close to the goods treated. Thus by moving the whole stringer toward or away from the goods the size of the string may be varied in still another or third way. Again since the orifices 60 have a horizontal movement and the chocolate is directed therefrom in a stream, it will be obvious that the amplitude of the resulting configuration upon the goods is affected by the height of the orifices from the goods: thus, if the orifices are throwing circles upon the goods these circles will be smaller if the orifices are close to the goods than if the orifices were farther away. By a single adjustment, therefore, provided by cam 1, the decorative effect and size of the strings may be widely varied. Whether the size alone or the size and configuration both of the string will be varied depends on the amplitude and speed of the lateral movement of the stringer: if the latter has not been moved laterally at all, i. e., is stationary to correspond to straight strings or only moving slightly or slowly laterally, either no variation or an inappreciable variation of the configuration of the decorative string will be brought about by moving the stringer vertically. But when the stringer is set to have a vigorous lateral play the variation in decorative effect which can be obtained by moving it vertically is considerable. I consider this a very important feature of this invention, for the reason that much can be done by a skilled operator to affect the product simply by turning the hand wheel 2, without stopping the machine, changing its speed or in any way tinkering with the various other special adjustments, provided, hereinabove described.

I wish to particularly emphasize the fact that I have devised this machine in such a fashion that the screws and spindles may be independently driven and that either or both may again be driven entirely independently of the compound movement devices; that a single gear drive, drives both the spindle and the screw devices, that I have so made the entire machine that every element thereof which comes in contact with the chocolate may be readily taken out and cleaned or replaced by another; that there is no possibility for the chocolate to creep up into and "mess up" parts which it was never intended to touch; that I have provided a simple and convenient means for setting, timing, and controlling every important moving part of the machine and that I have further provided convenient means for adjusting every relation of the operating parts one with another in every phase of their individual operations.

Having now described my invention, but recognizing that many changes and modifications may be made from the specific forms in which I have chosen here to illustrate it without departing from the scope of the invention, which is more truly bounded and defined by the claims hereto appended, I claim:

1. In a machine for handling fluid or semi-fluid material, a tank for said fluid and having an opening at the bottom thereof, a vibratory spindle associated with said opening to eject the fluid, a skeleton screw concentric with, but spaced from said spindle, means to vibrate the spindle and to rotate the screw, whereby as the spindle and screw perform their several functions the fluid is free at all times to flow about and between the spindle and the screw and into and out from the space therebetween.

2. A sub-combination in a machine for handling fluids and semi-fluids and including a tank having an opening therein, involving, in combination, a sleeve, a spindle slidable in said sleeve, a screw secured to and depending from said sleeve, said sleeve being concentric with but spaced at all points from said spindle whereby said parts may be readily disassociated for cleaning and whereby the fluid is at all times free to flow in and about said spindle and screw, and into and out of the space therebetween, in any direction.

3. In a machine for expelling jets of a fluid or a semi-fluid, a tank having a series of openings therein together with wells leading to said openings, a removable cover plate for each opening and provided with an orifice, a spider removably seated in said opening and provided with a bearing alined with said orifice, a sleeve revolubly mounted in said tank, a spindle slidable in said sleeve, a double skeleton helix rigid with said sleeve and concentric with, but spaced from said spindle, whereby the entire expelling mechanism is open for the free flow of the liquid therethrough and thereabout and further may be readily disassembled for cleaning.

4. In a machine of the class described, a tank having openings, a battery of sleeves revolubly mounted in said tank and positively connected from one end of the battery to the other, a master-gear for driving one of said sleeves, helixes mounted in said sleeves for forcing the fluid toward said openings, sprockets on a plurality of non-adjacent sleeves, and a chain trained over said sprockets, whereby the fluid is stirred during the revolution of the sleeves.

5. In a machine for handling fluid or semi-fluid material, a tank having orifices for the discharge of said fluid, a carrier associated with said tank, a series of spindles depending from said carrier and associated at their lower ends with said orifices, means for limiting the downward movement of said carrier, means for vibrating said carrier, comprising a revoluble ratchet, means for controlling the vibratory action of said carrier comprising manual means, including a cam whereby the weight of said carrier may be taken from said limiting means and placed on said ratchet or surrendered to said limiting means from said ratchet at the will of the operator.

6. In a machine for handling fluid or semi-fluid material, a tank having orifices, a carrier plate having a socket for coöperation with a stud on said tank, and said stud, spindles depending from the plate and associated with said orifices, a ratchet coöperating with said plate to give a vibratory movement thereto, a cam face associated with said ratchet, a slide bar having a cam face coöperating with said last-named cam face, whereby said carrier plate may be raised from said stud or lowered thereto by movement of said slide bar.

7. In a machine for handling fluid or semi-fluid material, a tank having orifices therein, a carrier plate, a series of spindles depending from said carrier plate for coöperation with said orifices, means for vibrating said carrier plate, comprising a ratchet, means for limiting the downward movement of said carrier plate, cam device associated with said ratchet and involving an incline, an upper and a lower horizontal face and a vertical face, a slidable cam device involving a vertical face, a horizontal face and an incline whereby when said second cam device is moved so that the two vertical faces abut, the ratchet is lowered to surrender the carrier plate to the limiting means, and when the slidable cam device is moved so that its horizontal face abuts the lower horizontal face of the other cam device the carrier plate is raised by and rests on the ratchet.

8. In a machine for handling fluid or semi-fluid material, a vat having orifices for the discharge of said fluid, a series of spindles having their lower ends associated with said orifices, means for adjusting all of said spindles in unison toward or away from said orifices, including means whereby any one of said spindles may be independently so adjusted.

9. In confectionery machinery, a vat having orifices for the discharge of a fluid from the vat, a battery of spindles coöperating with said orifices, means to adjust the distance of all of said spindles from said orifices including means whereby the distance of any individual spindle from its orifice may be adjusted with relation to the distance of any other spindle from its corresponding orifice.

10. In confectionery machinery, a vat having a series of orifices, a battery of spindles individually coöperating with said orifices, devices on each spindle whereby its relation to its orifice may be adjusted, a common operator controlling all of said devices, said devices being so constructed and arranged that any one thereof may be removed from the control of said operator and adjusted independently of the others and thereafter returned to the control of the operator in its new relation to the others.

11. In a machine of the class described, a carrier plate, a battery of sleeves threaded into said plate, a gear having a limited sliding capacity in each sleeve, a worm alined with all of said gears when the latter are at one limit of their sliding range, and a spindle revoluble in each sleeve.

12. In a machine for handling fluid or semi-fluid material, a vat having orifices, a carrier plate, a battery of spindles depending from said carrier plate for individual coöperation with said orifices, means to vibrate said carrier plate to positively eject fluid from said vat through the intermediary of said spindles, comprising ratchets supporting said plate, means to individually adjust said spindles with relation to the carrier plate, means to lower said ratchets, whereby said spindles may or may not come to a seat in said orifices, according to their individual adjustment relative to the carrier plate.

13. In confectionery machinery the combination of a traveling conveyer, a stringer located above the conveyer, means to give a compound movement to said stringer, comprising a carrier bar upon which said stringer is mounted, means for giving a compound movement to the bar, together with means whereby the stringer may be adjusted longitudinally of the bar.

THEODOR KIHLGREN.

Witnesses:
F. G. NEAL,
H. E. HARTWELL.

Copies of this patent may be obtained for five cents each, by addressing the "Commissioner of Patents, Washington, D. C."